Patented Oct. 15, 1935

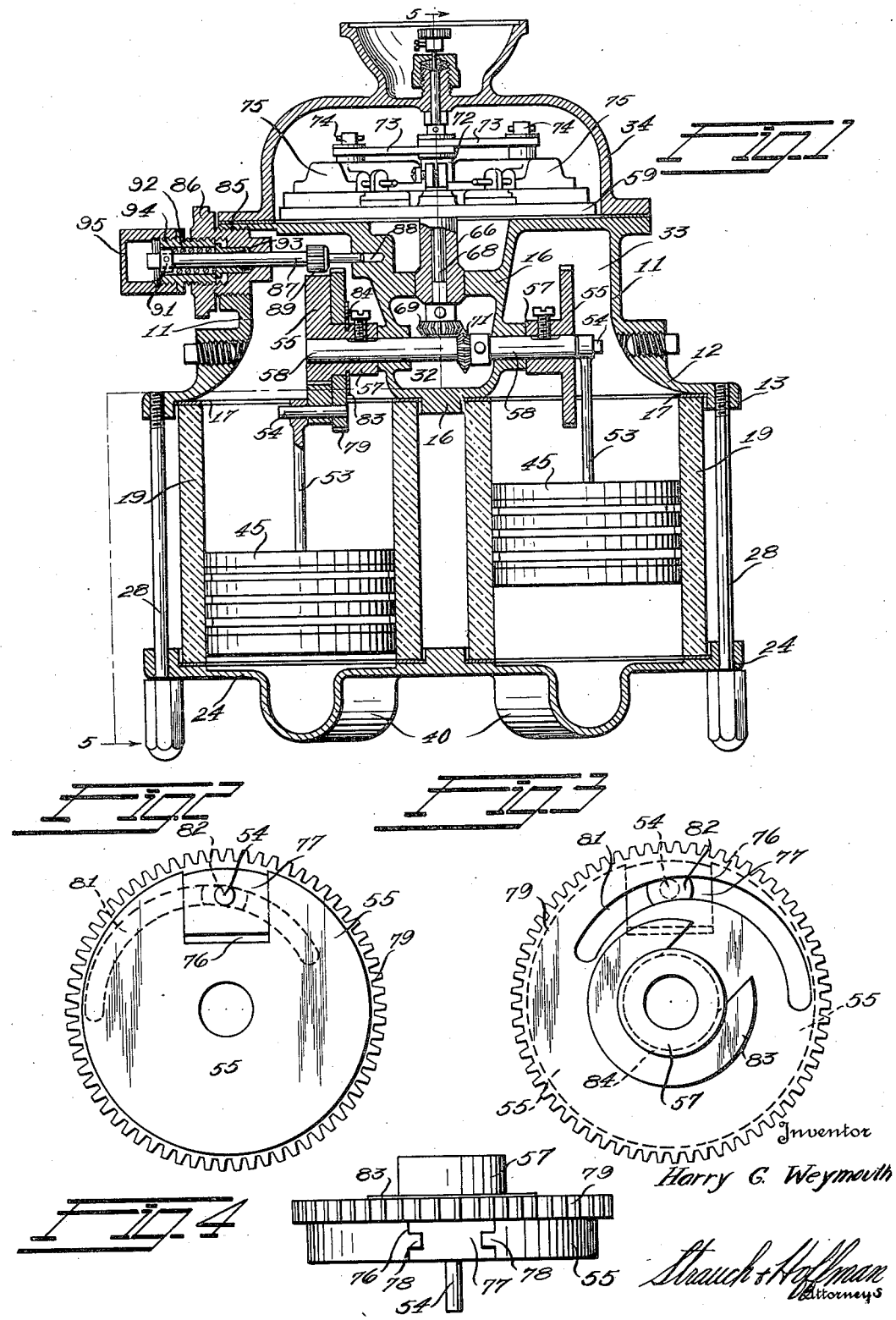

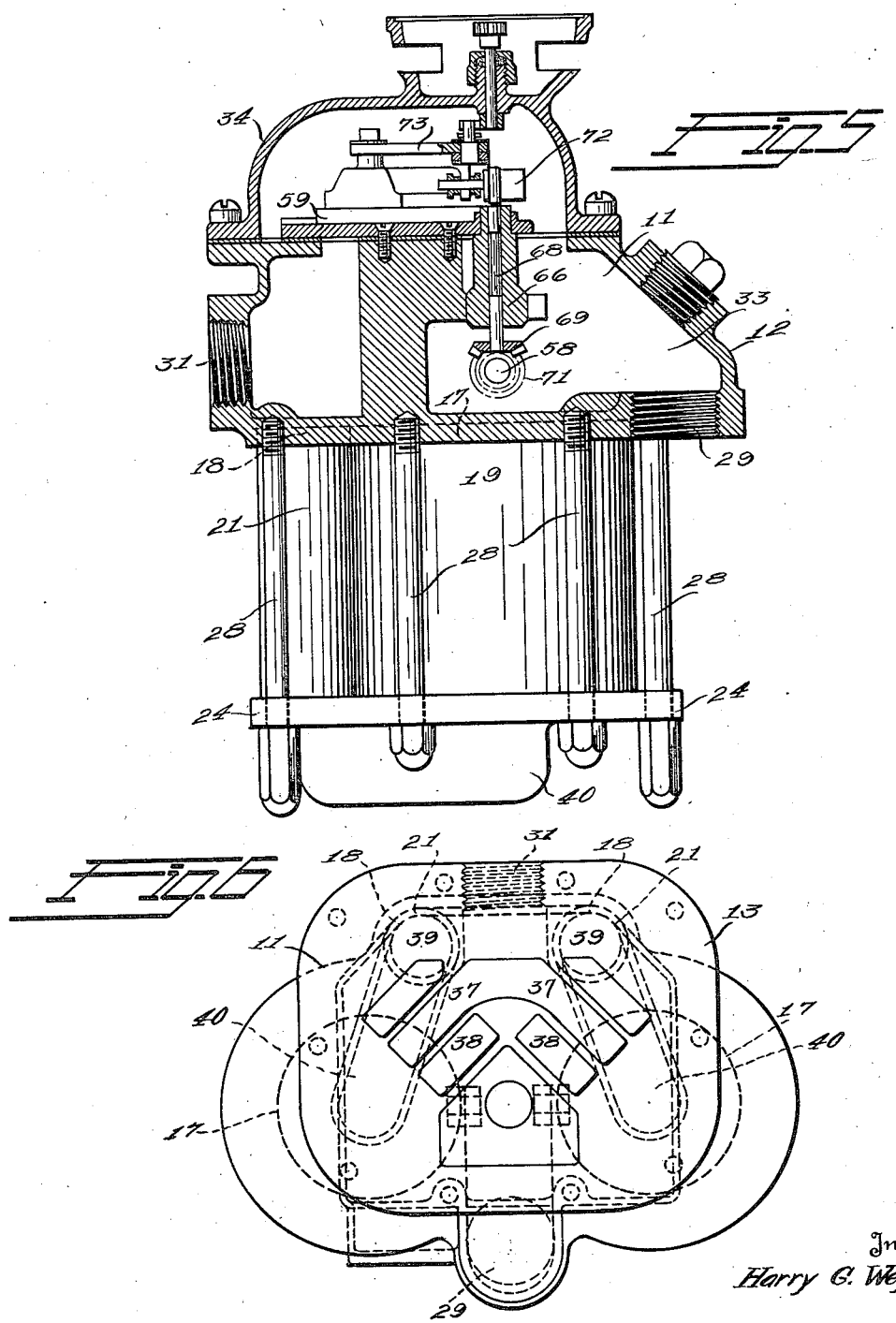

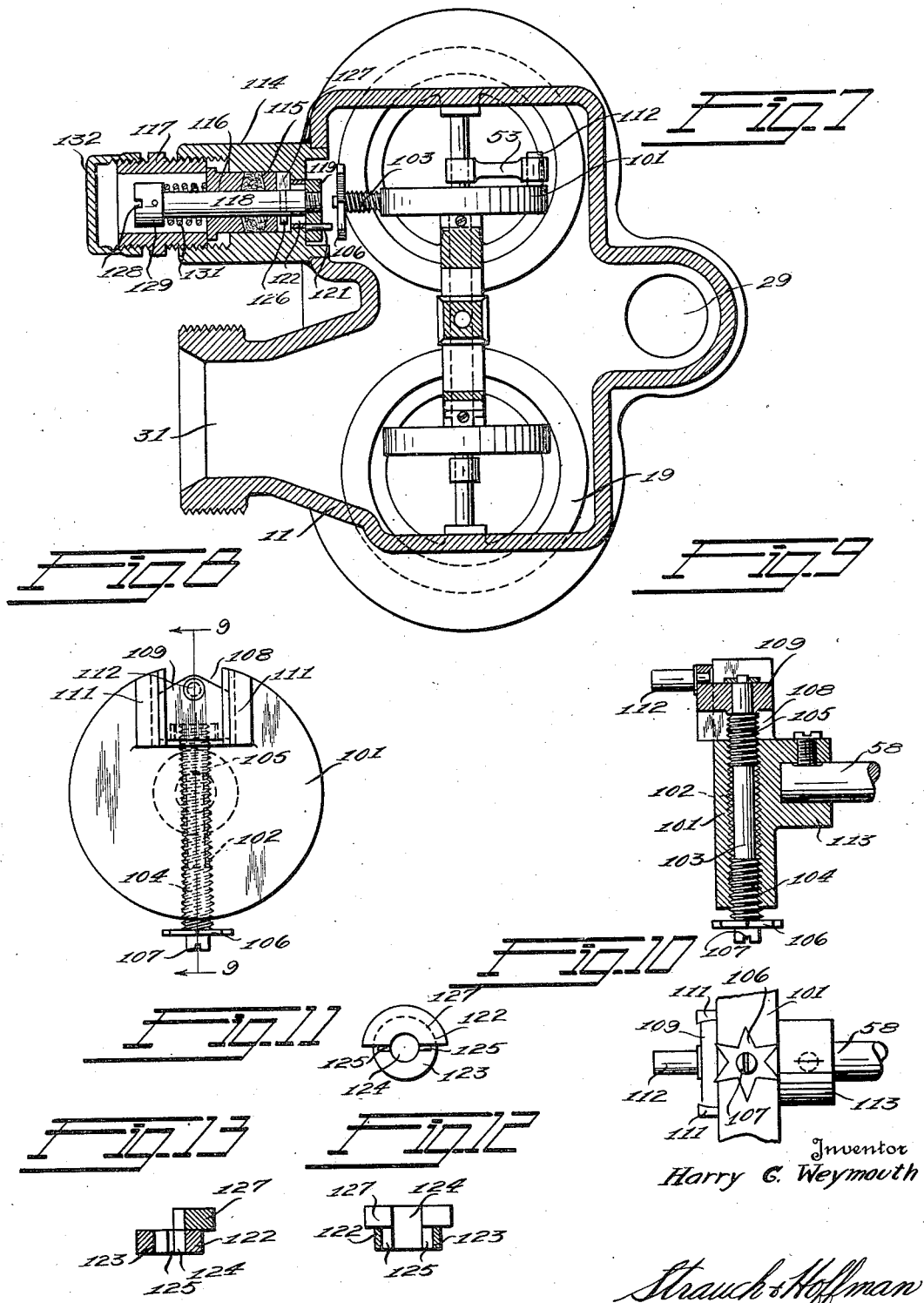

2,017,267

UNITED STATES PATENT OFFICE 2,017,267

CALIBRATING MECHANISM FOR PISTON METERS

Harry G. Weymouth, Pittsburgh, Pa., assignor to Pittsburgh Equitable Meter Company, Pittsburgh, Pa., a corporation of Pennsylvania Application September 30, 1930, Serial No. 485,513

8 Claims. (Cl. 73—30)

The present invention relates to a fluid metering mechanism and more particularly to fluid meter mechanisms of the double acting piston type. While fluid meter mechanisms according to this invention are adapted for fluids of any character they are particularly useful with a gasoline dispensing apparatus due to the novel and simple adjustments for calibrating them for accuracy.

This application is a continuation-in-part of my application Ser. No. 415,716 filed Dec. 21, 1929, entitled "Piston type meter."

In systems designed for the ready dispensing of liquid such as gasoline the liquid is usually supplied under pressure to a discharge hose and the flow is controlled by a manually operable valve arranged in the discharge end of the hose. Such systems are usually provided with meters of various types that are actuated by the flow of gasoline and communicate movement to a registering mechanism, the dial and hands thereof being arranged to be visible to the purchaser of the gasoline.

In order to comply with various municipal and State regulations regarding the accuracy of gasoline dispensing systems in dispensing fluids of varying specific gravities it is necessary that these systems be provided with some means of adjustment, so that the registering mechanism will accurately register the true volume of fluid passing through the meter, within certain prescribed limits of accuracy.

One object of this invention, therefore, is to provide a ready adjustment for liquid dispensing meters of the piston type.

Another object of this invention is to provide an adjustment for the throw of a piston-type dispensing pump system, such adjustment being readily accessible without dis-mantling the pump or the associated mechanism, and the adjusting mechanism being furthermore so arranged that adjustment can be made from the exterior of the casing, thus greatly facilitating the calibration of the meter.

A further object of this invention is to provide a fluid metering mechanism of the reciprocating piston type, the piston being connected to a drive shaft for actuating the registering means, with readily adjustable friction drives between the connecting rod of the piston and the drive shaft for the registering means.

A further object of this invention is to provide a readily accessible and easily adjustable calibrating mechanism for a piston type meter in which the parts will not slip after once being adjusted, and in which accurate and close adjustment may be made while the meter is completely assembled.

These and various other objects of this invention will be apparent from the following description and appended claims when taken in connection with the accompanying drawings wherein:—

Figure 1 is a vertical section of one embodiment of my invention showing the adjustment for one of the pistons.

Figure 2 is a front elevation of the crank disk shown in Figure 1.

Figure 3 is a rear elevation of the disk shown in Figure 2.

Figure 4 is a top plan of the disk shown in Figures 2 and 3.

Figure 5 is a central view taken substantially on line 5—5 of Figure 1.

Figure 6 is a top plan view of the distributing valve chamber of Figure 1, the valve housing and the valve mechanisms being omitted.

Figure 7 is a broken sectional view taken from above, of a modified form of adjustment.

Figure 8 is a front elevation of the piston crank disk of Figure 7.

Figure 9 is a view taken substantially on line 9—9 of Figure 8.

Figure 10 is a bottom plan of Figures 9 and 8.

Figures 11, 12 and 13 are a top plan, side elevation, and central sectional views of the guide collar used with the modification shown in Figure 7.

Referring to the drawings by reference characters in which like parts are designated by similar characters, and referring particularly to Figures 1–6 inclusive, there is provided a ported casting 11, which provides a support for valve mechanism and the operating means therefore and in effect provides a crank shaft housing. The casting 11 is of general rectangular form in plan as indicated in Figure 6 and embodies a skirt portion 12 and a marginal flange 13.

As indicated in Figures 1 and 5 the casting 11 is of skeleton formation to define the necessary ports and the walls for said ports. The skirt portion 12 and a central portion 16 are formed to define circular seats 17 and 18.

Removably secured to seats 17 are the upper ends of transparent cylinders 19 and removably secured to seats 18 are the upper ends of tubular members 21 which are preferably cylindrical. The lower ends of cylinders 19 and tubular members 21 are supported in seats on a bottom plate 24. Suitable gaskets are interposed at the opposite ends of the cylinders 19 and the tubular member 21 for providing fluid-tight connections.

The plate 24 is removably secured to casting 11 by means of a plurality of vertically disposed bolts 28 which extend through the margin of the bottom plate 24 and are threaded into the casting 11. By this construction, the casting 11, cylinders 19, tubular members 21 and bottom plate 24 are removably secured together in fluid-tight engagement whereby the parts may be expeditiously disassembled for cleaning, repairing or replacing of parts, it being only necessary to remove the bolts 28 to effect separation.

The casting 11 embodies an inlet connection 29 and an outlet connection 31 adapted for connection with supply and dispensing lines. The inlet connection 29 communicates with chamber 33 in the casting 11 defined by the outer face of said casting and a valve cover 34 removably secured to the casting 11 by suitable bolts. Casting 11 is provided with ports 37 in communication with the outlet connection 31 as well as through the outer face of said casting. The casting is further provided with a pair of ports 38 in communication with the outer ends of cylinders 19 and opening through the outer face of said casting. Said casting is further provided with a pair of ports 39 communicating with the outer ends of tubular members 21.

Bottom plate 24 is provided with a pair of passages 40 respectively connecting cylinders 19 with the tubular members 21.

Disposed in each of the cylinders 19 is a piston 45 adapted for vertical reciprocation therein by alternating fluid pressures on the opposite sides thereof. Pistons 45 may be of any desired construction having the usual sealing means thereon for yielding engagement with the side walls of the cylinders. Each piston has a connecting rod 53 secured thereto, the outer end of which rotatably engages crank pin 54 secured adjacent the margin of a crank member or eccentric 55. Crank members or eccentric 55 in the form of disks, are positioned within the casting 11 and partially project into the outer ends of the cylinders 19. The crank disks 55 have integral hub portions 57 suitably secured to opposite ends of a cross shaft 58 which is suitably journaled in the casting 11 and extends through the central chamber 32 as clearly indicated in Figure 1.

The outer face of casting 11 is accurately machined for fluid-tight contact therewith of a similarly machined bottom portion of a one-piece valve seat 59 removably secured to the casting 11 with suitable securing elements. Valve seat 59 includes an extension 66 which projects downwardly to provide a bearing for a vertical shaft 68 which has at its inner end a bevel pinion 69 meshing with a similar pinion 71 secured to shaft 58. Shaft 68 extends upwardly into the chamber formed by the valve cover 34 and has secured thereto a crank 72 to which is rotatably secured the inner ends of valve actuating rods 73, the opposite ends of which arms are rotatably engaged with pins 74 on the outer ends of slide valves 75.

The metering mechanism thus far described, is substantially the same as that shown in my prior application 415,716 and the operation thereof is similar to the operation described in said application. The valves 75 are of such size that not more than two of the ports are in communication therewith at one time. In one position of the valves, the ports 37 and 38 are in communication, and port 39 is open to the distributing chamber 33, whereupon fluid will enter port 39 and will pass through to the vertical member 21 and passage 40 to the bottom of one piston 45 which at this time is at the lower limit of its stroke, whereby the piston 45 will be forced upwardly. Movement of the piston operates connecting rod 53 and rotates the crank disk 55 to impart rotation to cross shaft 58 which in turn through pinions 69 and 71 will impart rotation to shaft 68 and by crank arm 72 will impart sliding motion to the valves 75, and as the piston 45 moves upwardly fluid in the chamber 41 will be forced outwardly through ports 38 to the outlet connection 31. As this piston 45 continues its upward movement the valves 75 are reciprocated to reverse the path of the liquid and connect the inlet portion 29 with the lower end of the other piston 45. The operation of these pistons will be continuous and since they are connected to the crank disks 55 at 90 degrees apart there will be no dead center for the meter.

In order that the meter may be accurately calibrated for correct registration of the volume of fluid, the novel adjustment mechanism, about to be described, is associated therewith. Referring to Figures 2, 3 and 4, one crank disk 55 is provided with a radial slot 76 in which is mounted a radially adjustable block 77, the slot 76 and the block 77 being provided with an interlocked tongue and groove 78 to prevent twisting of these parts. The block 77 carries the crank pin 54 to which its connecting rod 53 is swivelled.

Journaled on the integral hub 57 of this crank disk 55 is a gear 79 which is of slightly greater diameter than the crank disk 55. The gear 79 is provided with a spiral slot 81 into which projects the headed end 82 of the crank pin 54. This headed end 82 of the crank pin is elongated in the direction of the slot 81 and is shaped to fit accurately in said slot.

The gear 79 is pressed into firm engagement with the crank disk 55 by a bowed friction spring 83 slidably engaged in a slot 84 in the hub 57 of the crank disk 55.

From the above description it will be clear that the crank pin 54 is not rigidly connected to the crank disk 55 but is carried by slidable block 77, and engages in slot 81 of gear 79. Rotation of the gear 79 is imparted to the crank disk 55 due to the frictional engagement of the meeting faces thereof caused by pressure of flat friction spring 83. It will be clear that the operative throw of the crank pin 54 is dependent upon the position of the portion 82 of said pin in the slot 81, it having been noted that slot 81 is spiral and different portions thereof are at different radial distances from the center of rotation of the shaft 58.

In order to provide a ready means for adjusting the position of the crank pin 54 and its end 82 in the slot 81, the casting 11 is provided with a threaded opening 85 in which is mounted a bushing or stuffing box body 86 providing a bearing for a shaft 87. The inner end of shaft 87 is guided for reciprocating and rotating movement in a bore 88 drilled in the casting 11. Shaft 87 has a pinion 89 secured thereto for meshing engagement with the gear 79. Near its opposite end the shaft 87 has secured thereto a collar 91, the end of the shaft beyond the collar being squared for the reception of a wrench. A spring 92 coiled around shaft 87 engages the collar 91 to hold the gear 89 normally out of engagement with gear 79. The opening for the shaft 87 is maintained fluid-tight by a stuffing box flange 93 held in position by an adjustable flange nut 94. A cap 95 is secured to the flange nut 94 for enclosing the outer end of the shaft 87.

The operation of this adjustment for calibrating for inaccuracies of the meter is as follows. Normally the spring 92 engaging with the collar 91 holds the shaft 87 outwardly and the pinion 89 does not engage with the gear 79. When it is necessary to adjust the meter to calibrate for inaccuracies, the cap 95 is removed and a wrench is engaged with the outer end of shaft 87 and shaft 87 is pushed inwardly until the pinion 89 engages with the teeth of gear 79. Rotation of the shaft 87 will then impart rotation to the gear 79 by way of the pinion 89 to thus turn the gear 79 with respect to the crank disk 55, the friction spring 83 allowing this relative movement. Rotation of the gear 79 causes the end 82 of the crank pin 54 to move in the spiral slot 81 to thus either approach or recede from the center of rotation of the disk 55. Clockwise rotation of the shaft 87 will cause the crank pin 54 to move inwardly carrying with it the sliding block 77 which will in effect shorten the stroke of the piston and the meter will dispense less fluid per revolution. Reverse rotation of the shaft 87 will lengthen the stroke of the piston and result in the meter dispensing more fluid per revolution.

It will thus be seen that a simple adjustment is provided wherein the meter may be accurately calibrated to correctly register flows, and such adjustments may be accomplished without dismantling the meter. Due to the fact that the slot 81 is spiral, and that the pinion 89 greatly reduces the motion of shaft 87 with respect to the gear 79, a very fine adjustment or calibration may be obtained. When the correct adjustment is obtained, the cap 95 is replaced and the friction spring 83 serves as an efficient drive for the registering mechanism associated with the meter.

In the form of invention disclosed in Figures 1–7 only one adjustment is shown for one of the pistons. Obviously, such an adjustment may be associated with both pistons if desirable. Also it will be understood that the invention is not limited to use with cylinders whose walls are transparent.

Referring now to Figures 7–13 there is disclosed a modified form of adjustment for the same type of meter. The details of the valves, cylinders and ports are not shown in Figures 7 to 13 since they may be similar to the form shown in Figures 1 to 6. The upper crank member 101, in the form of a disk, shown in detail in Figures 8 and 9, is provided with a radial bore 102 which is threaded for the reception of a pin 103. The pin 103 has threaded portions 104 and 105 adjacent opposite ends thereof for engagement with the threads of bore 102. One end of the pin 103 projects beyond the periphery of the crank disk 101 and has rigidly secured thereto a star wheel 106 and is provided with a kerf 107 for the reception of a screwdriver.

The bore 102 terminates in a slot 108, and slidably received in said slot is a slide block 109. The block 109 is swivelled to the projecting end of the pin 103. The face of crank disk 101 is provided with outwardly projecting portions 111 which are angularly cut toward slot 108, the block 109 being provided with a similarly shaped overhanging portion to engage between the members 111.

The block 109 has secured thereto the crank pin 112 for engagement with the connecting rod 53 of the piston.

From the construction as thus described, it will be obvious that rotation of the pin 103 will carry the crank pin 112 away from or closer to the center of rotation of the crank disk 101, said crank disk being provided with a hub portion 113 for engagement with a shaft 58, similar to shaft 58 of Figure 1. Rotation of the pin 103 is initially accomplished and the parts are initially assembled, by engagement of a screwdriver with the kerf 107 thereof. In order to readily adjust the throw of the crank disk 101 by movement of the pin 103 the following mechanism is associated with the meter.

Referring to Figure 7 it will be seen that the meter is provided with a stuffing box body 114 having its central axis in the plane of movement of the rotary crank disk 101. This stuffing box body has a stuffing box collar 115 and a stuffing box flange 116 for compressing packing therebetween by means of a gland nut 117 threaded into the body 114. Mounted for reciprocation and rotation in the stuffing box body is a shaft 118 having secured to its inner end a plate 119 carrying a pin 121.

The inner end of the shaft 118 is guided by a guide collar 122 shown in detail in Figures 11, 12 and 13. This guide collar 122 has a lower portion 123 adapted for a forced fit with the lower end of the stuffing box body. A circular opening 124 passes through the guide collar 122 and the opening is elongated at opposite sides as shown at 125 to accommodate a pin 126 secured to shaft 118. The guide collar is further provided with an upwardly and outwardly projecting flange portion 127 which is received within the bore of the stuffing box body 114. The outer end of shaft 118 is provided with a kerf 128 adapted to receive a screwdriver, said kerf being provided in a head 129 beneath which is a coil spring 131 engaging the stuffing box flange 116 to normally hold the shaft 118 outwardly in the position shown in Figure 7. The outer end of the gland nut 117 is closed by detachable cover 132.

The operation of this modification of my invention is as follows. The meter functions in the manner previously described in connection with Figures 1–6, the pistons being reciprocated by pressure of the liquid and passing the liquid in measured quantities through the outlets of the meter. Figure 7 illustrates the application of the adjusting mechanism to only one of the crank disks 101, but it will be obvious that this adjustment may be applied to both pistons of the meter if this is found desirable. Operation of the upper crank disk 101 will cause the star wheel 106 carried thereby to pass the outwardly projecting pin 121 carried by the shaft 118 as seen in Figure 7.

When it is necessary to adjust the meter to calibrate for inaccuracies in the registering mechanism, the cap 132 is removed and a screwdriver is inserted in the kerf 128. If the necessary adjustment is a positive one, that is, if the meter is delivering less fluid than the register indicates, the plunger 118 is pushed directly inwardly from the position shown in Figure 7. By this movement of the shaft 118 the pin 126 thereof enters one of the slots 125 of the bearing block 122 and the crank 119 and the pin 121 move inwardly such that said pin intersects the path of movement of the star wheel 106. The meter is then caused to rotate by hand or otherwise and for each revolution of the crank disk 101 the pin 121 engages the star wheel and causes a partial rotation thereof. This rotation will gradually turn the threaded shaft 103 upwardly into the crank disk 101 to slide the block 109 outwardly therein, and thus increase the operative throw of the crank pin 112 and thereby cause the meter to deliver more fluid for each reciprocation of the piston. When reverse calibration is desired the shaft 118 is rotated 180° from the position shown in Figure 7 to a position wherein the pin 126 carried by said shaft will enter the opposite slot 125 and when pushed inward the pin 121 will engage the prongs of the star wheel on the opposite side. Rotation of the crank disk 101 will therefore turn the shaft 103 slowly outwardly to decrease the operative throw of the crank pin 112 and its piston.

The portion 127 of the bearing 122 provides two faces 180 degrees apart for engagement by the pin 126 such that said pin cannot be moved more than 180 degrees. The opposite slots 125 cooperate with the pin 126 in such manner that the shaft 118 cannot be pushed inwardly except when the same is in one of its two extreme positions for adjustment. The spring 131 normally retains the shaft 118 in its inoperative position wherein the pin 121 does not interfere with the throw of the crank pin 101.

It will be understood that in the various forms of my invention the cylinders may be made transparent or opaque whichever is desirable, the transparent walls being advantageous when the meter is positioned in the view of the purchaser of the liquid to avoid the necessity of using a separate indicator to show the flow of liquid.

From the embodiments of the invention as illustrated, it will be apparent to those skilled in the art that various other expedients may be adopted to give a variable and adjustable throw to the crank shaft of these meters.

The invention may be embodied in other specific forms without departing from the spirit or essential characteristics thereof. The present embodiment is therefore to be considered in all respects as illustrative and non restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:—

1. In a liquid meter, the combination of a casing, a crank shaft adapted to operate a register and having a crank member thereon, a block carrying a crank pin adjustably secured to said crank member, a reciprocating piston connected to said crank pin for operating said crank shaft, means rotatable with said crank member for adjusting the radial position of said block and pin without the necessity of halting said crank member and bringing it to a predetermined position, and reciprocable means extending through said casing and adapted, in a forward operative position, to engage said adjusting means for causing movement thereof relative to the crank member to adjust the radial position of said block and pin, said means being retractible into an inoperative position, and means for sealing said reciprocable means against leakage.

2. In a liquid meter the combination of a casing, a crank shaft adapted to operate a register and having a crank member thereon, a block carrying a crank pin adjustably secured to said crank member, a reciprocating piston and connecting rod connected to said crank pin for operating said crank shaft, means rotatable with said crank member and projecting therefrom for adjusting the radial position of said block and pin, said means being susceptible of adjustment without the necessity of halting said crank member and bringing it to a predetermined position and a rod mounted in the wall of said casing in sealing relation thereto and having a member thereon arranged to be interposed in the path of said adjusting means for causing movement thereof to adjust the radial position of said block and pin.

3. In a liquid meter the combination of a casing, a crank shaft adapted to operate a register and having a crank member thereon with a radial bore, a threaded shaft engaged in said bore carrying a block and crank pin, a reciprocating piston and connecting rod connected to said crank pin for operating said crank shaft, means extending from said threaded shaft for rotating said threaded shaft, means mounted in a wall of said casing and extending through said casing into the path of said first means for coacting with said first means for rotating said threaded shaft, while said crank member is in operation.

4. In a liquid meter the combination of a casing, a crank shaft adapted to operate a register and having a crank member thereon, a threaded shaft radially disposed of said crank member and engaged therewith, a block carrying a crank pin engaging said threaded shaft, a reciprocating piston and connecting rod connected to said crank pin for operating said crank shaft, an operating member secured to said threaded rod and projecting therefrom and rotated with said crank member, and a rod mounted to reciprocate in a portion of said casing and adapted to be inserted in the path of said operating member to cause rotation thereof while said crank member is in operation.

5. In a liquid meter the combination of a casing, a crank shaft adapted to operate a register and having a crank member thereon, a threaded shaft radially disposed of said crank member and engaged therewith, a block carrying a crank pin engaging said threaded shaft, a reciprocating piston and connecting rod connected to said crank pin for operating said crank shaft, a star wheel pin secured to said threaded rod and projecting therefrom and rotated with said crank member, and a rod mounted to reciprocate in a portion of said casing and adapted to be inserted in the path of said star wheel to rotate the same to adjust said block and pin while said crank member is in operation.

6. In a liquid meter the combination of a casing, a crank shaft adapted to operate a register and having a crank member thereon, a block carrying a crank pin, adjustable means for securing said block to said crank member, a reciprocating piston and connecting rod connected to said crank pin for operating said crank shaft, a gear adjustably secured to said crank member and rotatable therewith, and having said crank pin extending through an eccentric slot therein, and a retractive rod having a pinion thereon adapted to mesh with said gear for causing rotation thereof to adjust the radial position of said block and pin.

7. In a liquid meter the combination of a casing, a crank shaft therein having a crank, means to adjust the throw of said crank without the necessity of halting the same and bringing it to a predetermined position, a reciprocating piston and connecting rod connected to said crank, a stuffing box body associated with said casing and having a gland therein, a rod arranged to reciprocate in said gland and stuffing box body and arranged to operate said throw adjusting means when in operative position, and means for normally retaining said rod in inoperative position.

8. In a liquid meter the combination of a casing, a crank shaft therein having a crank, means to adjust the throw of said crank without the necessity of halting the same and bringing it to a predetermined position, a reciprocating piston and connecting rod connected to said crank, a stuffing box body associated with said casing and having a gland therein, a rod arranged to reciprocate in said gland and stuffing box body and arranged to operate said throw adjusting means when in a relatively forward position, means for normally retaining said rod in a relatively retracted and inoperative position, a threaded sleeve for adjusting said gland, and a cap threaded on said sleeve for covering the outer end of said rod.

HARRY G. WEYMOUTH.